US008623774B2

(12) United States Patent
Byers et al.

(10) Patent No.: US 8,623,774 B2
(45) Date of Patent: *Jan. 7, 2014

(54) PRINTING BLANKET CONSTRUCTION

(75) Inventors: Joseph L. Byers, Inman, SC (US); W. Toriran Flint, Ashville, NC (US); Samuel R. Shuman, Belgrade, MT (US); Tony W. Koons, Fletcher, NC (US)

(73) Assignee: Day International, Inc., Dayton, OH (US)

( * ) Notice: Subject to any disclaimer, the term of this patent is extended or adjusted under 35 U.S.C. 154(b) by 791 days.

This patent is subject to a terminal disclaimer.

(21) Appl. No.: 12/535,746

(22) Filed: Aug. 5, 2009

(65) Prior Publication Data

US 2009/0286443 A1 Nov. 19, 2009

Related U.S. Application Data

(63) Continuation of application No. 11/733,397, filed on Apr. 10, 2007, now Pat. No. 7,598,186.

(60) Provisional application No. 60/790,981, filed on Apr. 11, 2006.

(51) Int. Cl.

| | |
|---|---|
| ***B32B 5/26*** | (2006.01) |
| ***B32B 5/28*** | (2006.01) |
| ***B32B 25/10*** | (2006.01) |
| ***B32B 25/12*** | (2006.01) |
| ***D03D 15/00*** | (2006.01) |

(52) U.S. Cl.

USPC ........... 442/255; 442/181; 442/239; 442/246; 442/260; 442/261; 442/268; 442/247; 442/301

(58) Field of Classification Search

USPC .................................... 442/59, 181, 239, 246

See application file for complete search history.

(56) References Cited

U.S. PATENT DOCUMENTS

| | | | | |
|---|---|---|---|---|
| 4,048,368 A | | 9/1977 | Hale et al. | |
| 4,425,398 A | | 1/1984 | Berczi | |
| 4,615,934 A | * | 10/1986 | Ellison | 442/313 |
| 4,682,480 A | | 7/1987 | Schnegg | |
| 4,770,928 A | | 9/1988 | Gaworowski et al. | |
| 4,879,163 A | | 11/1989 | Woiceshyn | |
| 5,066,537 A | | 11/1991 | O'Rell et al. | |
| 5,069,958 A | | 12/1991 | Burns, Jr. | |
| 5,366,799 A | * | 11/1994 | Pinkston et al. | 442/260 |
| 5,498,470 A | | 3/1996 | McLean et al. | |
| 5,549,968 A | | 8/1996 | Byers et al. | |
| 6,500,776 B2 | | 12/2002 | Hamada et al. | |
| RE38,468 E | | 3/2004 | Lane, III et al. | |

(Continued)

FOREIGN PATENT DOCUMENTS

| | | |
|---|---|---|
| EP | 0069590 A2 | 1/1983 |
| EP | 0459609 A1 | 12/1992 |
| GB | 1327757 | 8/1973 |
| WO | 03022595 A1 | 3/2003 |

*Primary Examiner* — Jennifer A Steele

(74) *Attorney, Agent, or Firm* — Dinsmore & Shohl LLP

(57) ABSTRACT

A printing blanket construction is provided which includes a reinforcing fabric ply comprised of a weft insertion fabric or a heavy gauge fabric, where the reinforcing fabric ply provides all of the necessary tensioning properties to the blanket. The use of the reinforcing fabric ply eliminates the need for additional reinforcing fabric plies in the blanket construction, and provides high tensile strength, low stretch, and resistance to gauge loss.

19 Claims, 3 Drawing Sheets

(56) References Cited

U.S. PATENT DOCUMENTS

2005/0255767 A1 * 11/2005 Flint et al. ....................... 442/38
2005/0255773 A1 * 11/2005 Klang et al. .................. 442/175
2005/0274270 A1 * 12/2005 Ogawa .......................... 101/376

* cited by examiner

PRINTING BLANKET CONSTRUCTION

CROSS-REFERENCE TO RELATED APPLICATIONS

This application is a continuation of U.S. patent application Ser. No. 11/733,397 filed Apr. 10, 2007, entitled PRINTING BLANKET CONSTRUCTION, which application claims the benefit of U.S. Provisional Application No. 60/790,981, filed Apr. 11, 2006, entitled PRINTING BLANKET CONSTRUCTION INCLUDING A SINGLE REINFORCING FABRIC PLY. The entire contents of said applications are hereby incorporated by reference.

BACKGROUND OF THE INVENTION

The present invention relates to a printing blanket construction, and more particularly, to a printing blanket including a reinforcing fabric ply comprised of a weft insertion fabric or a heavy gauge fabric, which reinforcing fabric ply provides all necessary tensioning properties to the blanket.

One of the most common commercial printing processes is offset lithography. In this printing process, ink is offset from a printing plate to a rubber-surfaced printing blanket mounted on a blanket cylinder before being transferred to a substrate, such as paper. Typically, the printing blanket is reinforced with a number of fabric plies to provide the desired low stretch and high tensile strength properties to the finished blanket. The fabric plies are typically comprised of woven blends of cotton and polyester or rayon ranging in gauge from 0.008 inches to 0.016 inches. They are typically stretched and finished such that the residual stretch is reduced. However, this is a cost additive operation as the fabrics must be treated in a separate procedure before being incorporated into the blanket construction. Often, two or more fabric layers are required in the printing blanket construction to achieve the desired low stretch and high tensile strength properties of the finished blanket. The multiple fabric layers also function to add thickness in order to achieve the desired gauge for the printing blanket. However, the fabrics typically used in the blanket construction are susceptible to gauge loss during printing operations, such that printing blankets which contain a number of fabric plies are more susceptible to gauge loss.

The addition of multiple fabric layers also adds to the complexity and cost of producing the printing blanket. It would be desirable to be able to provide a blanket construction having the desired tensioning properties, including low stretch and high tensile strength, which does not require the use of multiple fabric plies.

Accordingly, there is still a need in the art for a printing blanket construction which is low in cost to produce, which does not require the use of multiple reinforcing fabric plies, and which exhibits desirable tensioning and gauge retention properties.

SUMMARY OF THE INVENTION

Embodiments of the present invention meet that need by providing a printing blanket construction including a reinforcing fabric ply comprised of a weft insertion fabric ply or a heavy gauge fabric ply, which reinforcing ply provides all of the required tensioning properties to the blanket, i.e., low stretch and high tensile strength, as well as providing and maintaining a desirable gauge. With the use of the reinforcing fabric ply as will be further described, additional reinforcing fabric plies are not required. However, additional fabric plies may optionally be included in the blanket construction for the purpose of filling space and/or adding thickness (gauge) to the blanket construction.

According to one aspect of the present invention, a printing blanket construction is provided comprising a printing surface layer over a reinforcing fabric ply selected from a weft insertion fabric ply or a heavy gauge fabric ply, where no additional reinforcing plies are provided between the reinforcing fabric ply and the printing surface layer. As used herein, the term "on" when referring to the position of the layers means that one layer is adjacent to and in contact with the layer that it is "on". As used herein, the term "over" refers to a layer or structure formed above or in contact with the uppermost surface of another layer or structure, and the term "below" refers to a layer or structure formed beneath or in contact with the lowermost surface of another layer or structure. "Upper" or "top" refers to the portion of a ply, or the blanket itself, which is furthest removed from the blanket cylinder when the blanket is installed thereon. "Lower" or "bottom" refers to the portion of the ply, or the blanket itself, that is closest to the blanket cylinder.

In one embodiment of the invention, the printing blanket construction further includes at least one compressible layer positioned between the printing surface layer and the reinforcing fabric ply. In another embodiment of the invention, the printing blanket construction may include a second fabric ply below the reinforcing fabric ply, where the second fabric ply does not function as a reinforcing ply, but rather functions to fill space and/or add thickness to the blanket construction.

Where the reinforcing fabric ply comprises a weft insertion fabric ply, the weft insertion fabric ply preferably comprises a polyester yarn having a denier of at least 1000, and more preferably, at least 1500. The weft insertion fabric ply preferably has a gauge ranging from about 0.010 inches to about 0.020 inches (0.03 to about 0.05 cm).

Where the reinforcing fabric ply comprises a heavy gauge fabric ply, the heavy gauge fabric ply is preferably comprised of polyester yarns. The heavy gauge fabric ply preferably has a gauge ranging from about 0.020 inches to about 0.040 inches (about 0.05 to about 0.10 cm). In embodiments where the reinforcing fabric ply comprises a heavy gauge fabric ply, a second fabric ply may be included above and/or below the reinforcing fabric ply for the purpose of filling space and/or adding thickness.

The reinforcing fabric ply comprising the weft insertion or heavy gauge fabric preferably has a tensile strength of greater than about 250 lbs/in. ($446.5\times10^2$ g/cm), more preferably, greater than about 300 lbs/in. ($535.8\times10^2$ g/cm), and most preferably, greater than about 400 lbs/in. ($714.31\times10^2$ g/cm).

The reinforcing fabric ply has a residual stretch of less than about 4%, more preferably, less than about 3%, and most preferably, less than about 2.5%.

The reinforcing fabric ply may be impregnated with an elastomeric compound to resist gauge loss. In addition, the reinforcing fabric ply may be treated with an adhesion promoting material to enhance adhesion to adjacent layers in the printing blanket construction.

Accordingly, it is a feature of embodiments of the present invention to provide a printing blanket construction for use in offset lithographic printing applications which includes a reinforcing fabric ply comprised of a weft insertion fabric ply or heavy gauge fabric ply which provides all of the desired tensioning properties to the blanket without the need for additional reinforcing fabric layers. Other features and advantages of the invention will be apparent from the following description, the accompanying drawings, and the appended claims.

DETAILED DESCRIPTION OF THE PREFERRED EMBODIMENTS

Figure 1:
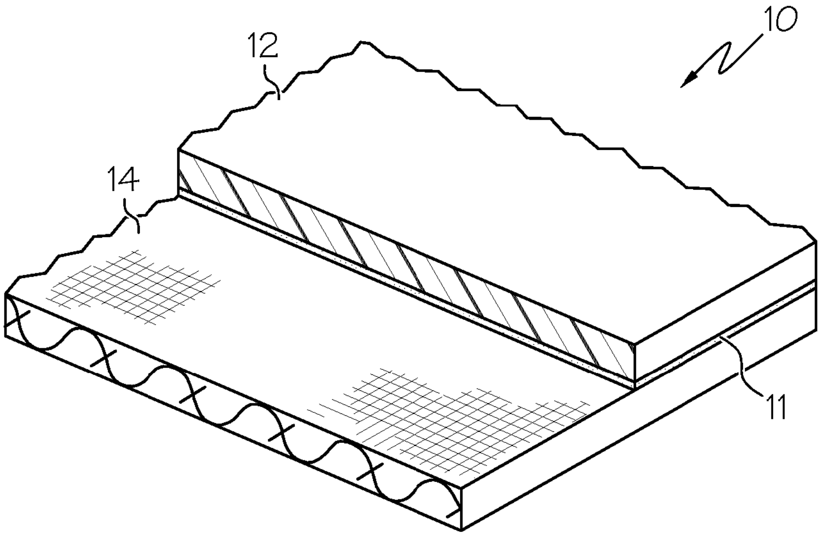
FIG. 1 is a perspective view of a segment of one embodiment of a printing blanket construction according to the present invention including a reinforcing fabric fabric ply.

Embodiments of the printing blanket of the present invention containing a reinforcing fabric ply comprised of a weft insertion fabric or heavy gauge fabric provide a number of advantages over prior art blankets which utilize multiple fabric plies to achieve the desired stretch and tensile strength properties of the finished blanket. Because the reinforcing fabric ply exhibits high tensile strength, low stretch, and resistance to gauge loss, a single ply can replace all of the standard fabric plies used in a typical prior art printing blanket which are susceptible to gauge loss. This results in a blanket that is more flexible, easier to install, and more resistant to gauge loss, all of which lead to a longer blanket life. The weft insertion or heavy gauge fabric plies used in embodiments of the present invention are also approximately equal to or less costly than the plies of conventional fabric used in the art and thus, the printing blanket of the present invention is less expensive to produce as conventional fabric plies are replaced and/or eliminated.

The reinforcing fabric ply preferably has a tensile strength of greater than about 250 lbs/in. (about $446.5\times10^2$ g/cm), more preferably, greater than about 300 lbs/in. (about $535.8\times10^2$ g/cm), and most preferably, greater than about 400 lbs/in. (about $714.4\times10^2$ g/cm) in at least the warp direction and preferably in both the warp and fill directions. The fabric ply preferably has a residual stretch of less than about 4%, more preferably less than about 3%, and most preferably, less than about 2.5% (based on a 1 inch (2.54 cm) wide, 50 lb. (22.7 kg) dead weight hang test) in at least the warp direction and preferably in both the warp and fill directions.

A preferred weft insertion fabric ply for use in the blanket construction comprises filament polyester yarns of at least 1000 denier and preferably at least 1500 denier in both the warp and fill directions. The fabric preferably has a warp end count of at least 18 and a fill pick count of at least 19. Preferred yarns for use in the fabric ply are commercially available from KOSA, SANS Fibers, Inc., and Hyosung Corp.

The weft insertion fabric ply preferably has a gauge ranging from about 0.010 inches to about 0.020 inches (from about 0.03 to about 0.05 cm), and more preferably, from about 0.014 to about 0.016 inches (about 0.04 cm).

Where the reinforcing ply comprises a heavy gauge fabric ply, the fabric ply preferably has a thickness of greater than 0.016 inches (about 0.04 cm). The ply is preferably comprised of 8/2 spun polyester yarns in both the warp and fill directions and has a warp end count of 37 and a fill pick count of 19. More preferably, the heavy gauge fabric ply is comprised of 1300 denier filament polyester warp yarns and 900 denier monofilament polyester fill yarns with a warp end count of 36 and a fill pick count of 34.

Another preferred heavy gauge fabric comprises a 4×1 Sateen weave with 11.6/1 spun polyester yarn in the warp direction and 7/1 spun polyester yarns in the fill direction and has a warp end count of 99 and a fill pick count of 33.

The heavy gauge fabric ply preferably has a gauge ranging from about 0.020 inches to about 0.040 inches (about 0.05 to about 0.10 cm), and more preferably from about 0.024 inches to about 0.035 inches (about 0.06 to about 0.09 cm).

While filament polyester yarns are preferred for use in the reinforcing fabric ply due to their reduced tendency for gauge loss, other yarns made from natural and synthetic fibers such as cotton, rayon, nylon, and others, or combinations thereof may be used in either of the weft insertion or heavy gauge fabric plies as long as they collectively provide the desired tensioning properties. The reinforcing fabric ply may also be altered to comprise, for example, more lower denier yarns or fewer higher denier yarns, as long as the collective fabric ply construction provides the desired tensioning properties. While not required, it is preferred that the fabric ply construction is balanced so that the tensile and stretch properties are nearly equal in both the warp and fill directions so that the blanket can be cut and installed in either direction to maximize cutting/converting efficiency.

It should also be appreciated that the reinforcing fabric ply may be treated in a number of ways to improve adhesion and/or to impregnate and/or fill the fabric to further improve resistance to gauge loss. Preferably, the reinforcing fabric ply is heat set and RFL (resorcinol formaldehyde latex) treated to promote adhesion to the other plies in the blanket. The reinforcing fabric ply is also preferably treated to resist gauge loss by impregnation of the individual fiber bundles with an elastomeric compound which may also function to promote adhesion. A preferred treatment method is disclosed in commonly-assigned U.S. Pat. No. 5,498,470, which is incorporated herein by reference.

After treatment, the weft insertion fabric preferably has a finished gauge of about 0.014 inches to about 0.016 inches (about 0.04 cm) and has a warp tensile strength of about 500 lbs/in. to about 600 lbs/in. (about $893\times10^2$ g/cm to about $1071.60\times10^2$ g/cm).

The heavy gauge fabric ply (after treatment) preferably has a finished gauge of about 0.023 inches to about 0.026 inches (about 0.058 to about 0.066 cm) and has a warp tensile strength from about 350 lbs/in. (about $625.10\times10^2$ g/cm) to about 650 lbs/in. (about $1160.9\times10^2$ g/cm). The heavy gauge fabric ply preferably has a residual stretch of less than about 2.5% and more preferably, less than about 1.5% (based on a 1 inch (2.54 cm) wide, 50 lb. (22.7 kg) dead weight hang test).

Referring now to FIG. 1, a cross-sectional view of one embodiment of the printing blanket construction 10 of the present invention is shown. The printing blanket preferably includes at least a printing surface layer 12 over a reinforcing fabric layer 14 with no other fabric or reinforcing layers therebetween. The printing surface layer 12 acts to transfer an inked image from a printing plate to a substrate and may be comprised of any suitable polymeric material including natural rubbers and synthetic resins. The reinforcing fabric layer 14 is preferably adhered to the printing surface layer 12 with an adhesive layer 11, which may comprise conventional adhesives including hot melt films.

While the blanket may contain one or more additional fabric layers, such fabric layers are added only for the purpose of filling space and/or adding thickness to the blanket construction. The additional fabric layers do not function as reinforcing layers. Examples of suitable space-filling fabrics include, but are not limited to, non-woven fabrics and unfinished, i.e., greige woven fabrics. By "greige" fabric, it is meant that the fabric has undergone no treatment or additional processing subsequent to weaving.

Where the reinforcing ply 14 comprises a weft insertion fabric, the construction may include an additional fabric ply below the weft insertion fabric, but should include no additional fabric layers or reinforcing layers above the reinforcing fabric. This construction is preferred so as to avoid buckling of the blanket or a "washboard" appearance on the bottom of the blanket when it is bent into a blanket cylinder lock-up. This can occur if a typical blanket fabric is positioned above the reinforcing fabric ply in the blanket construction due to the lack of compressibility which is inherent in the reinforcing fabric as well as the tight spacing between the filament yarns in the reinforcing (weft insertion or heavy gauge) fabric ply. It should be appreciated that in order for a non-reinforcing fabric layer to be included above the reinforcing fabric ply, such a fabric would require an elongation greater than 80%, preferably greater than 220%, and most preferably, greater than 260%. Alternatively, the balanced properties of the reinforcing fabric ply can be sacrificed, and fill yarns reduced in count and/or size or replaced with a more compressible yarn type to provide for smoother bending of the blanket.

Figure 2:
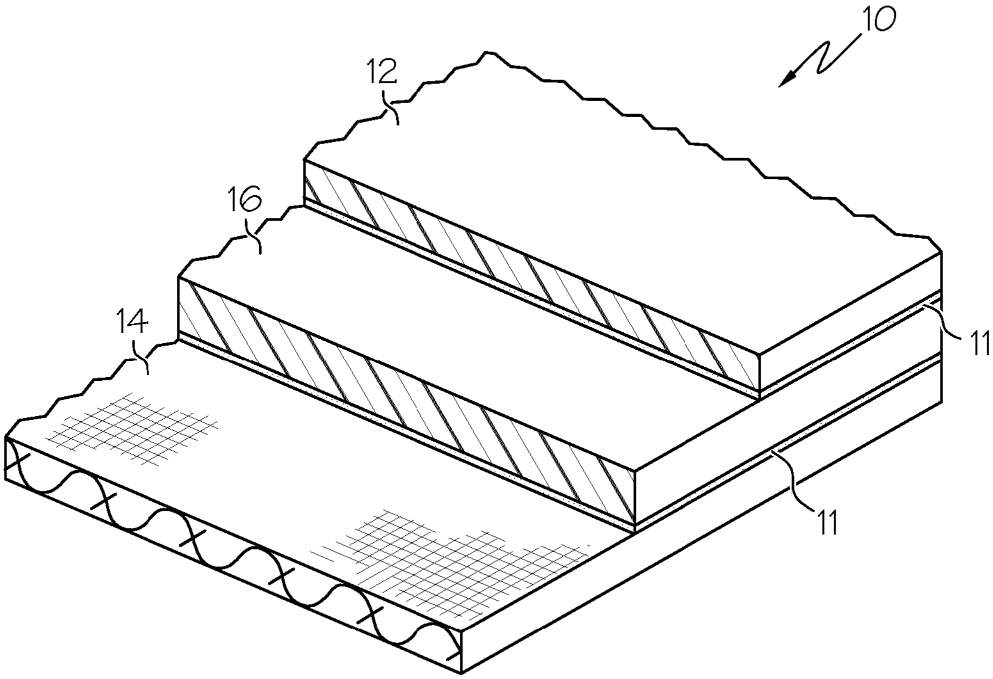
FIG. 2 is a perspective view of a segment of another embodiment of a printing blanket construction according to the present invention including a reinforcing fabric ply and a compressible layer therein.

As shown in FIG. 2, the blanket may optionally include a compressible layer 16 between the printing surface layer 12 and reinforcing fabric layer 14. The compressible layer is preferably formed from a compressible elastomeric material such as, for example, an elastomer composition as described in commonly-assigned U.S. Pat. No. 4,770,928, incorporated herein by reference. The blanket may include additional compressible layers, if desired. As shown, the compressible layer 16 may be adhered to reinforcing fabric ply 14 with an adhesive 11.

Figure 3:
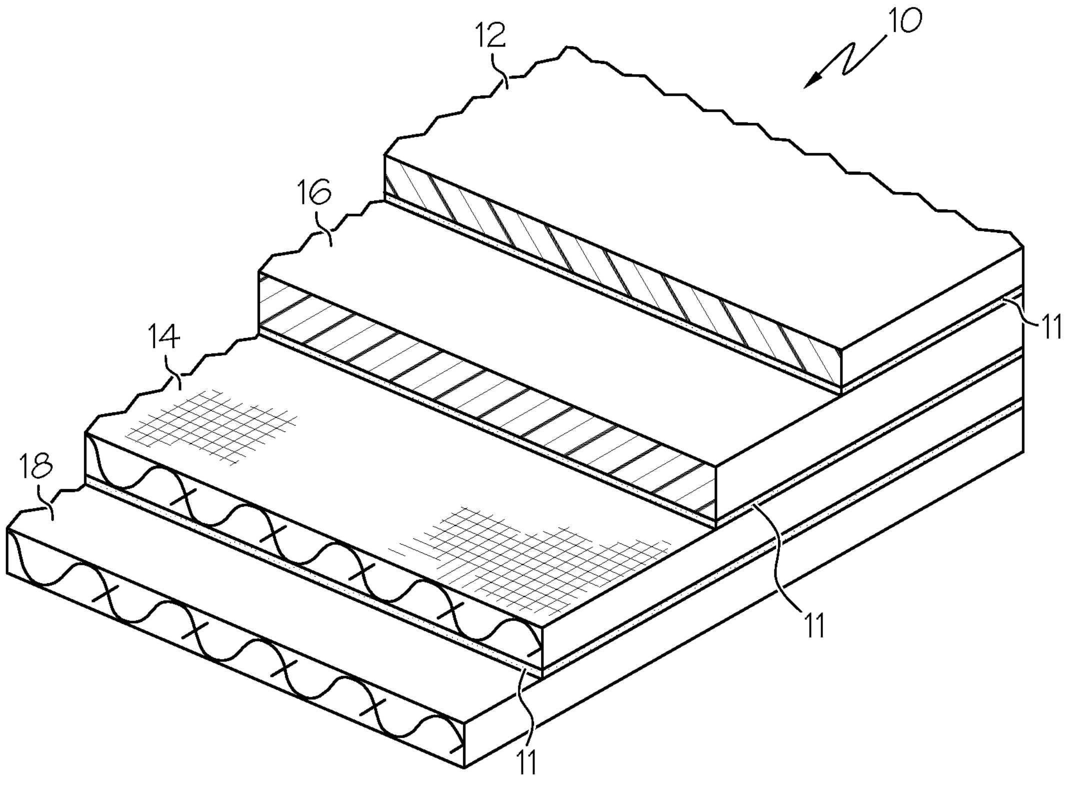
FIG. 3 is a perspective view of a segment of an another embodiment of the printing blanket construction including a reinforcing fabric ply, a compressible layer, and an additional fabric ply.

In another embodiment of the invention illustrated in FIG. 3, the printing blanket includes a printing surface layer 12, a compressible layer 16 over the reinforcing fabric ply 14, and an additional fabric ply 18 below the reinforcing fabric ply 14.

Figure 4:
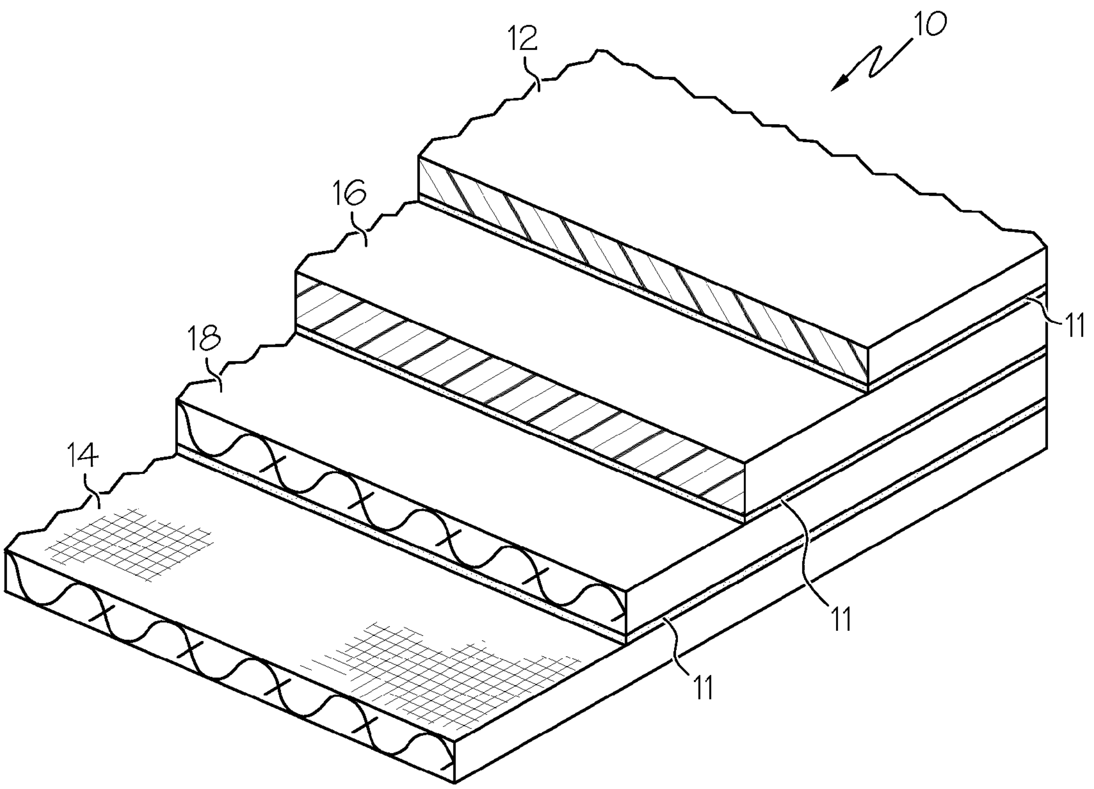
FIG. 4 is a perspective view of a segment of another embodiment of the printing blanket construction including a reinforcing fabric ply comprising a heavy gauge fabric, a compressible layer, and an additional fabric ply.

In another embodiment illustrated in FIG. 4, the printing blanket includes a printing surface layer 12, a compressible layer 16, and a reinforcing fabric ply 14 which is comprised of a heavy gauge fabric ply. In this embodiment, an additional fabric ply 18 is included above the reinforcing fabric ply to add thickness to the blanket construction.

In use, the printing blanket is mounted on a blanket cylinder by using conventional lock-up devices known in this art.

Having described the invention in detail and by reference to preferred embodiments thereof, it will be apparent that modifications and variations are possible without departing from the scope of the invention.

What is claimed is:

1. An offset printing blanket construction comprising:

a smooth printing surface layer for transferring ink from a printing plate to a substrate, said printing surface layer positioned on a single woven reinforcing fabric ply selected from a weft insertion fabric ply having a denier of at least 1000 or a heavy gauge fabric ply having a gauge of between about 0.020 and 0.040 inches (0.05 to about 0.10 cm), said reinforcing fabric ply having a tensile strength of greater than about 250 lbs/in. ($446.5\times10^2$ g/cm), said single reinforcing ply providing all tensioning properties to said blanket.

2. The printing blanket construction of claim 1 further including at least one compressible layer.

3. The printing blanket construction of claim 1 further including a second fabric ply comprising a non-reinforcing fabric ply comprised of a non-woven fabric or greige woven fabric.

4. The printing blanket construction of claim 3 including a third non-reinforcing fabric ply.

5. The printing blanket construction of claim 3 including a fourth non-reinforcing fabric ply.

6. A printing blanket construction comprising:

a printing surface layer adapted to transfer ink from a printing plate to a substrate, said printing surface layer positioned on a single reinforcing fabric ply comprising a weft insertion fabric ply comprising a polyester yarn having a denier of at least 1500, said reinforcing fabric ply having a tensile strength of greater than about 250 lbs/in. ($446.5\times10^2$ g/cm), said reinforcing fabric ply providing all tensioning properties to said blanket.

7. The printing blanket construction of claim 1 wherein said reinforcing fabric ply is a heavy gauge fabric ply comprised of polyester yarns.

8. The printing blanket construction of claim 1 wherein said reinforcing fabric ply has a tensile strength of greater than about 300 lbs/in. ($535.8\times10^2$ g/cm).

9. The printing blanket construction of claim 1 wherein said reinforcing fabric ply has a tensile strength of greater than about 400 lbs/in. ($714.31\times10^2$ g/cm).

10. The printing blanket construction of claim 1 wherein said reinforcing fabric ply has a residual stretch of less than about 3%.

11. The printing blanket construction of claim 1 wherein said reinforcing fabric ply has a residual stretch of less than about 2.5%.

12. The printing blanket construction of claim 1 wherein said reinforcing ply is a weft insertion fabric ply having a gauge ranging from about 0.010 inches to about 0.020 inches (0.03 to about 0.05 cm).

13. The printing blanket construction of claim 1 wherein said reinforcing ply is a heavy gauge fabric ply having a gauge ranging from about 0.020 inches to about 0.040 inches (0.05 to about 0.10 cm).

14. The printing blanket construction of claim 1 wherein said reinforcing fabric ply has been impregnated with an elastomeric compound.

15. The printing blanket construction of claim 1 wherein said reinforcing fabric ply has been treated with an adhesion promoting material.

16. An offset printing blanket construction comprising a smooth printing surface layer for transferring ink from a printing plate to a substrate, a compressible layer and a single woven reinforcing fabric ply having a tensile strength greater than about 250 lb/in. ($446.5\times10^2$ g/cm) selected from a weft insertion fabric ply and a heavy gauge fabric ply, said single reinforcing ply providing all tensioning properties to said blanket.

17. The printing blanket construction of claim 16 further including a second fabric ply comprising a non-reinforcing fabric ply comprised of a non-woven fabric or greige woven fabric.

18. The printing blanket construction of claim 17 including a third non-reinforcing fabric ply.

19. The printing blanket construction of claim 17 including a fourth non-reinforcing fabric ply.

* * * * *